Aug. 13, 1940.  S. J. WELTER  2,211,039

THREAD CUTTING TOOL HOLDER

Filed March 9, 1939

INVENTOR
SEBASTIAN J. WELTER
By Parker, Carlson, Pitney & Hubbard
ATTORNEYS

Patented Aug. 13, 1940

2,211,039

UNITED STATES PATENT OFFICE 2,211,039

THREAD CUTTING TOOL HOLDER

Sebastian J. Welter, Chicago, Ill., assignor to Armstrong Bros. Tool Co., Chicago, Ill., a corporation of Illinois Application March 9, 1939, Serial No. 260,709

2 Claims. (Cl. 29—96)

The invention relates to thread cutting tool holders adapted for use in lathes and other metal working machines.

The object of the present invention is to provide a new and improved holder for a thread cutting tool which will avoid any objectionable tendency to tear the material of the blank being cut, and which will provide a clean smooth cut so as to obtain an accurate and finished thread.

Other objects and advantages will become apparent as the description proceeds.

In the accompanying drawing, Figure 1 is a side elevational view of a tool holder embodying the features of my invention.

Figure 1:
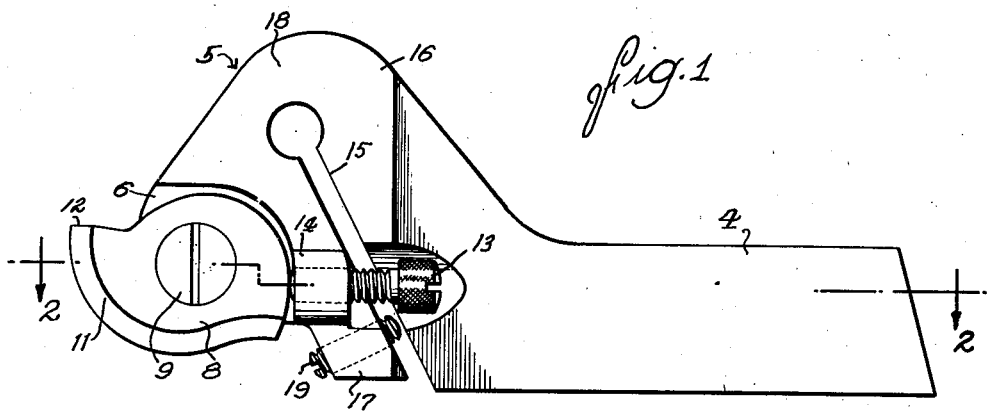
Figure 2:
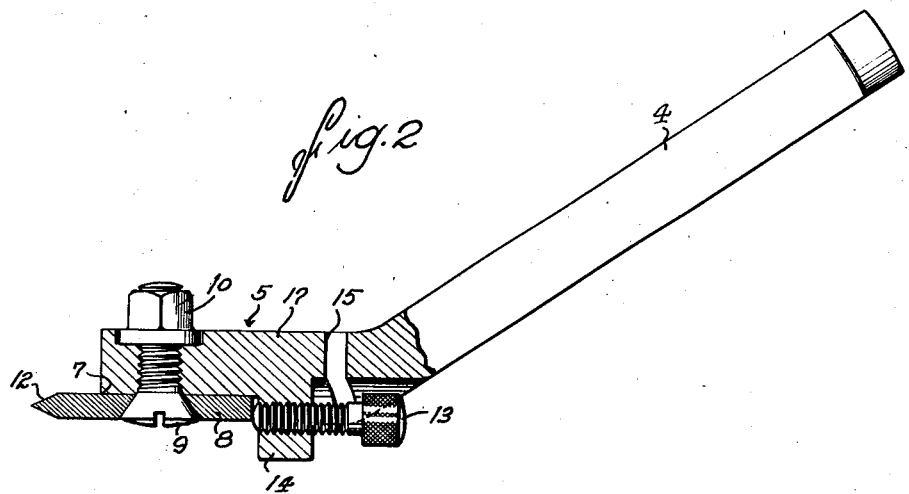
Fig. 2 is a view of the holder partially in plan and partially in section along line 2—2 of Fig. 1.
Figure 3:
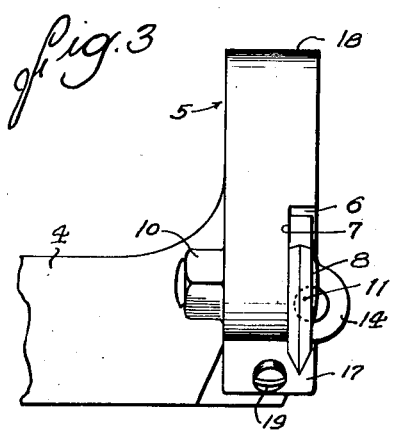
Fig. 3 is a fragmentary end elevation of the holder.

Referring more particularly to the drawing, the holder comprises an elongated shank 4 adapted to be removably secured in a suitable supporting fixture (not shown) as in a lathe or other metal working machine. A head 5 is integral with the forward end of the shank 4, and is inclined thereto.

One side of the head 5 is formed with a recess 6 presenting a flat mounting surface 7 for a suitable formed thread cutting tool or chaser 8. In the present instance, the tool 8 is in the form of a flat replaceable element secured for pivotal adjustment against the surface 7 by a pivot bolt 9 threaded through the head 5 and locked by a nut 10. The tool element 8 has a forwardly projecting tooth 11 with a formed cutting contour 12, for example, V-shaped, complementary to the thread groove to be cut. The tooth 11 is provided with a spiral back relief by reason of which the cutting face can be repeatedly reground without varying the effective contour.

A clamp screw 13 is threaded through a lug 14 on the head 5 into the recess 6 for engagement with the curved heel of the tool element 8 to back up the latter in position of adjustment against the cutting thrust.

Heretofore, thread cutting lathe tools of the present type have had a tendency to tear the work material, thereby resulting in a rough cut, and consequently a rough and inaccurate thread. An important feature of the present invention resides in the elimination of the aforesaid tendency. To this end, the head 5 is formed rearwardly of the recess 6 with a straight slot 15. This slot is inclined upwardly and forwardly, and almost fully bisects the head 5 to define a stationary base portion 16 and a tool supporting portion 17 interconnected by a resilient restricted neck 18. Consequently, the slot 15 provides a spring mounting which permits the tool element 8 to yield in response to the cutting thrust. The resiliency of the mounting dampens irregularities in the cutting action, and prevents tearing of the work material. It is effective in producing a smooth clean cut and hence a smooth accurate thread even in materials most subject to the aforesaid difficulties.

A stop screw 19 is adjustably threaded through the free end of the tool supporting portion 17 into the slot 15 for end engagement with the opposed side of the slot to limit the permitted degree of flexure. In instances where the spring action is not desired, the screw 19 may be threaded into engagement with the opposed side of the slot to lock the parts 16 and 17 against relative flexure.

I claim as my invention:

1. A holder for a formed thread cutting tool comprising, in combination, a shank, an inclined and enlarged head integral with one end of said shank and formed with a straight elongated transverse slot opening from the bottom and defining a stationary base portion and a tool supporting portion resiliently interconnected at the inner end of said slot, a formed thread cutting tool secured for pivotal adjustment to said supporting portion below the inner end of said slot and having a forwardly projecting relieved cutting tooth with an upwardly facing cutting face, a clamp screw threaded through said supporting portion into engagement with the heel of said tool below the pivotal mounting of the latter to oppose the cutting thrust, and a stop screw adjustably threaded through the free end of said supporting portion into said slot for engagement with the opposed side of said slot to limit or prevent relative spring flexure of said base portion and supporting portion.

2. A holder for a formed thread cutting tool comprising, in combination, a shank, an enlarged head rigid with one end of said shank and formed with a straight elongated transverse slot opening from the bottom and defining a stationary base portion and a tool supporting portion resiliently interconnected at the inner end of said slot, said slot being inclined inwardly and forwardly, a formed thread cutting tool secured for pivotal adjustment to said supporting portion below the inner end of said slot and having a forwardly projecting relieved cutting tooth with an upwardly facing cutting face, a clamp screw threaded through said supporting portion into engagement with the heel of said tool below the pivotal mounting of the latter to oppose the cutting thrust, and a stop screw adjustably threaded through the free end of said supporting portion into said slot for engagement with the opposed side of said slot to limit or prevent relative spring flexure of said base portion and supporting portion.

SEBASTIAN J. WELTER.